(12) United States Patent
Pöllabauer

(10) Patent No.: US 8,045,920 B2
(45) Date of Patent: Oct. 25, 2011

(54) APPARATUS FOR ACCESS CONTROL, AND READ/WRITE DEVICE

(75) Inventor: Reinhard Pöllabauer, Vienna (AT)

(73) Assignee: EVVA-WERK Spezialerzeugung von Zylinder- und Sicherheitsschlossern Gesellschaft m.b.H. & Co. KG, Vienna (AT)

(*) Notice: Subject to any disclaimer, the term of this patent is extended or adjusted under 35 U.S.C. 154(b) by 522 days.

(21) Appl. No.: 12/308,968

(22) PCT Filed: Jun. 26, 2007

(86) PCT No.: PCT/AT2007/000315
§ 371 (c)(1),
(2), (4) Date: Dec. 30, 2008

(87) PCT Pub. No.: WO2008/011643
PCT Pub. Date: Jan. 31, 2008

(65) Prior Publication Data
US 2009/0309699 A1 Dec. 17, 2009

(30) Foreign Application Priority Data
Jul. 25, 2006 (AT) ................................ A 1265/2006

(51) Int. Cl.
*H03B 5/00* (2006.01)
(52) U.S. Cl. .................... 455/41.1; 455/41.2; 340/5.61; 340/5.64
(58) Field of Classification Search .................. None
See application file for complete search history.

(56) References Cited

U.S. PATENT DOCUMENTS

| | | | |
|---|---|---|---|
| 6,992,565 B1 | 1/2006 | Giesler | |
| 2005/0017841 A1 | 1/2005 | Doi et al. | |
| 2007/0115094 A1 | 5/2007 | Gillert et al. | |
| 2009/0096577 A1* | 4/2009 | Pollabauer | 340/5.64 |
| 2009/0121833 A1* | 5/2009 | Falck et al. | 340/5.64 |

FOREIGN PATENT DOCUMENTS

DE 10 2004 050 071 A1 7/2002
(Continued)

OTHER PUBLICATIONS

Zimmerman, T.G., Personal Area Networks: Near-Field Intrabody Communication, IBM Systems Journal, vol. 35, Nos. 3 & 4, 1996, pp. 609-617.

*Primary Examiner* — An Luu
(74) *Attorney, Agent, or Firm* — Chapman and Cutler LLP

(57) ABSTRACT

In an access control device including a lock with a locking element, an actuating element for the locking element, an electronic key, a receiver unit for receiving key identification data and an evaluation circuit for determining access authorization based on the received identification data, the evaluation circuit cooperates with the actuating element and/or the locking element for selectively locking or unlocking the lock. The electronic key includes means for generating a capacitive near field via which the identification data is emitted. Furthermore, a device for coupling the capacitive near field to the person carrying the key is provided. The receiver unit is designed as a device separate from the lock and comprises at least one capacitive coupling surface such that, at a contact of the capacitive coupling surface or an approach of the capacitive coupling surface by said person, an alternating current circuit is closed and an electric flux is created across the receiver unit, which can be detected by the receiver unit.

23 Claims, 2 Drawing Sheets

FOREIGN PATENT DOCUMENTS

| | | |
|---|---|---|
| DE | 10 2004 044 375 A1 | 3/2006 |
| EP | 1 013 517 A2 | 6/2000 |
| EP | 1 013 517 A3 | 6/2000 |
| EP | 1 102 215 A2 | 5/2001 |
| EP | 1 102 215 A3 | 5/2001 |
| EP | 1 168 678 A1 | 1/2002 |
| EP | 1 235 190 A1 | 8/2002 |
| EP | 1 239 420 A1 | 9/2002 |
| WO | WO 00/15931 A1 | 3/2000 |
| WO | WO 2005/062236 A2 | 7/2005 |
| WO | WO 2005/062236 A3 | 7/2005 |
| WO | WO 2005/088559 A1 | 9/2005 |

* cited by examiner

APPARATUS FOR ACCESS CONTROL, AND READ/WRITE DEVICE

The present invention relates to an access control device including a lock with a locking element, an actuating element for the locking element, an electronic key, a receiver unit for receiving key identification data and an evaluation circuit for determining access authorization based on the received identification data, said evaluation circuit cooperating with the actuating element and/or the locking element for selectively locking or unlocking the lock. The invention further relates to a write/read device for such a device.

In the following, electronic keys are meant to encompass various configurations and, in particular, cards, key rings or chains, and combinations of mechanical and electronic keys.

Access control devices of the initially defined kind have become known in various configurations. Thus, radio remote-controlled locks are, for instance, known, in particular for locking and unlocking car doors, wherein a mobile electronic key is provided to send identification data via a radio link to a receiver of the lock, optionally in encoded form. The lock has an electrical circuit for evaluating and optionally decoding the received information, whereby the lock is actuated as soon as the access authorization has been determined based on the received identification data. Besides such radio remote-controlled locks, there are also access control systems using transponder keys. For actuating the lock, the transponder key merely has to be brought to a few centimeters near a transmitter-receiver unit of the lock, whereby the identification data stored in the transponder key is read out inductively.

Furthermore, so-called "human area networks (HAN)" have become known, in which the skin of the person carrying an electronic device is used as a transmission medium for the exchange of data between at least two electronic devices. Data transmission in this case is not effected via electromagnetic waves or light, but via weak electrical fields on the skin surface. This is also called a capacitive near field, wherein, as a rule, a transmitter generating a capacitive near field and means for coupling the near field to the skin of the respective person are provided. The data modulated onto the electrical field are subsequently received by a receiver and evaluated accordingly.

From EP 1 239 420 A1, an identification system has become known, in which a separate field is generated in that object which is intended to be at least partially reached by a user. A field coupled to the user, and a secondary field in their surroundings, are capacitively coupled. A code transmitter carried by the user will recognize the secondary field and only then send a code signal to confirm authorization.

The present invention aims to simplify the handling of the access control and improve conventional access control systems so as to provide increased safety, reduce chances of manipulation by unauthorized persons, prevent maloperations as well as enhance reliability, user-friendliness and durability.

To solve this object, the access control device of the initially defined kind is essentially characterized in that the electronic key comprises means for generating a capacitive near field via which the identification data is emitted, and a device for coupling the capacitive near field to the person carrying the key, and that the receiver unit is designed as a wall or desktop reader unit separate from the lock and the actuating element and comprises at least one capacitive coupling surface such that, at a contact of the capacitive coupling surface or an approach of the capacitive coupling surface by said person, an alternating current circuit is closed and an electric flux is created across the receiver unit, which can be detected by the receiver unit. Due to the fact that the transmission of the identification data is effected from the electronic key to the lock by the aid of a capacitive near field, the electronic key itself need not be brought into the immediate vicinity of the receiver of the lock, and no separate activation of the key, for instance by touching a button, is required. It will rather do for the electronic key to be near the body of the respective user, for instance in a trouser pocket, briefcase or the like, whereby the emission and transmission of the identification data are effected via a capacitive near field which is coupled to the body surface of the respective user by the electronic key. As soon as the person carrying the key approaches a capacitive coupling surface of the receiver unit, or touches the coupling surface or a part conductively connected with the coupling surface, the data transmission itself takes place from the transmitter of the key to the receiver unit via the capacitive near field, thus causing an alternating current circuit to close and induce an electric flux across the receiver unit, which can be detected by the receiver unit. The identification data may, for instance, be modulated onto a carrier frequency generated by the electronic key.

The user-friendliness of the access control when unlocking a lock is thus substantially improved while, at the same time, ensuring that data transmission will only be effected if the person carrying the key approaches the separate receiver unit or touches the same, so that opportunities of manipulation by third parties will almost be excluded. Due to the fact that, according to the invention, a low-energetic capacitive near field is applied, the energy consumption of the access control system and, in particular, the power consumption of the electronic key will, moreover, be extremely low. In the main, extremely small currents will be created by the capacitive near field, which, even when transmitted via the user's skin, are completely harmless to the human organism.

The retrofitting of existing locks will be facilitated in that the receiver unit and optionally all of the circuits required for the evaluation of the received data are arranged in the receiver unit, which is separate from the lock, so that the lock itself need not be exchanged if it is an electrically actuatable lock.

The provision of a receiver unit which is separate from the lock also offers the advantage that the receiver unit can be configured to optimize the handling and reception quality of the lock irrespectively of the structural conditions of the same. It is, furthermore, feasible in a simple manner to equip the external receiver unit, which may, for instance, be designed as a wall reader, with other functions. Thus, additional identification and access authorization checks such as fingerprint scanners, iris scanners or keypads for inputting access codes may, for instance, be provided. Such additional control facilities may be provided to replace the access control enabled by the electronic key, for instance, in the event of a malfunctioning key or as a complementary safety step.

In addition, the configuration of the receiver unit as a unit separate from the lock will facilitate the connection of the receiver unit to external and internal communication networks or databases such as, for instance, time detection systems etc.

As far as the concrete configuration options of the receiver unit are concerned, it is provided in a preferred manner that the receiver unit of the lock comprises at least two electrodes jointly forming a receiver capacitor. In this case, it will, as a rule, be most advantageous if the electrodes of the receiver capacitor are arranged on a location within the receiver unit, through which the major portion of the electric flux passes. The course of the electric flux through the receiver unit depends on the concrete structural configuration of the individual parts of the receiver unit such as, e.g., the housing and the housing lid as well as on the respective installation situation of the receiver unit. Depending on the concrete configuration of the receiver unit as well as the installation situation, more or less strong stray fields are formed such that care has to be taken that the electrodes of the receiver capacitor are arranged on a location through which the electric flux passes so as to enable an alternating current circuit to close, for instance, via the wall in which the receiver unit is installed and the ground back to the electronic-key-carrying person and the key, and the data exchange to occur.

For the simple opening or locking of a lock, a unidirectional data exchange from the electronic key to the lock via the receiver unit will do. According to a preferred further development, a bidirectional data exchange is, however, provided, wherein a transmission unit for transmitting data to the electronic key is provided. Such a back-channel from the receiver unit to the key can, for instance, serve coding purposes and the transmission of additional data, which can subsequently be stored in the key to be transmitted back to the lock or the evaluation circuit during the next opening procedure to follow. The back-transmission of such data may, for instance, also be effected for the purpose of subsequently conveying such data from the receiver unit to a central database or to person-related systems such as time detection systems.

The transmission unit preferably comprises means for generating a capacitive near field and for coupling said field to the person carrying the key. The transmission unit in this case may again comprise at least two electrodes jointly forming a transmitter capacitor. In this respect, the configuration can be devised such that the electrodes of the receiver capacitor and the electrodes of the transmitter capacitor are designed to be independent of and separate from each other. However, in an advantageous manner, the configuration is devised such that at least one of the electrodes of the receiver capacitor forms, at the same time, also one of the electrodes of the transmitter capacitor. In this case, it is either feasible that a single electrode simultaneously constitutes an electrode of the receiver capacitor and an electrode of the transmitter capacitor, with each capacitor additionally having a further electrode, or that a total of only two electrodes alternately forming the receiver capacitor and the transmitter capacitor are provided.

The concrete configuration of the electrodes may be realized in various ways, with a configuration being preferred in which at least one of the electrodes is formed as a conductive foil on a component of the receiver unit. Instead of a conductive foil, it may also be contemplated that at least one of the electrodes is formed as a conductive coating, in particular varnish, of a component of the receiver unit.

In order to facilitate mounting of the receiver unit and to enable its configuration as a wall reader in a simple manner, it is preferably provided that the electrodes of the receiver capacitor are arranged in an electrical installation box or formed as parts of the same.

Various options are conceivable to achieve a particularly beneficial arrangement of the electrodes, in particular within an electrical installation box. Thus, with an installation in a wall, a good stray behavior against the ground will preferably be achieved in that one of the electrodes of the receiver capacitor is arranged in a plane transverse to the other electrode of the receiver capacitor, wherein the conditions of a cylindrical installation box will be accounted for particularly well if, as in correspondence with a preferred configuration, one of the electrodes of the receiver capacitor is designed to be circular and the other electrode of the receiver capacitor is designed to have its axis arranged transverse to the circular electrode according to a partial jacket surface of a cylinder, the radius of the cylinder preferably substantially corresponding to the radius of the circular electrode. This will result in a particularly compact and space-saving configuration despite the achievement of good reception characteristics. In order to increase the internal capacity of the receiver capacitor, this configuration may preferably be further developed such that the circularly designed electrode carries a projection arranged within the jacket surface of the other electrode and curved parallelly with the same.

With the separate receiver and/or reader unit being mounted horizontally, for instance for use as a desktop reading device, a configuration is preferred, in which the two electrodes of the receiver capacitor are arranged in parallel, wherein it will be particularly preferred if one of the two parallelly arranged electrodes is arranged within the parallel projection of the other electrode and preferably has a smaller surface area.

As already mentioned, the receiver unit is to be designed as a unit separate from the lock, the connection to the lock being feasible in a wireless manner or by the aid of a cable. In this case, the receiver unit, preferably along with other components or circuits of the locking device, such as e.g. the transmitter unit or the evaluation circuit, may be combined to an external read or write/read device. The evaluation circuit performing the evaluation of the data received from the electronic key in terms of access authorization in this case may preferably likewise be arranged within the external read or write/read device such that the external read or write/read device will combine any components required for the access control according to the invention, so that an external read or write/read device of this type need only be electrically connected with a conventional electrically operable lock. The retrofitting or upgrading of existing locks is thus substantially facilitated.

The integration of the read or write/read device in other in-house systems is preferably enabled in that the read or write/read device comprises an interface for transmitting identification data as well as optionally authorization information of the electronic key, and information on the closing and/or opening procedures, to external equipment such as, for instance, time detection systems and the like.

In the following, the invention will be explained in more detail by way of an exemplary embodiment schematically illustrated in the drawing. Therein, FIG. 1 is a schematic illustration of the access control device according to the invention;

Figure 1:
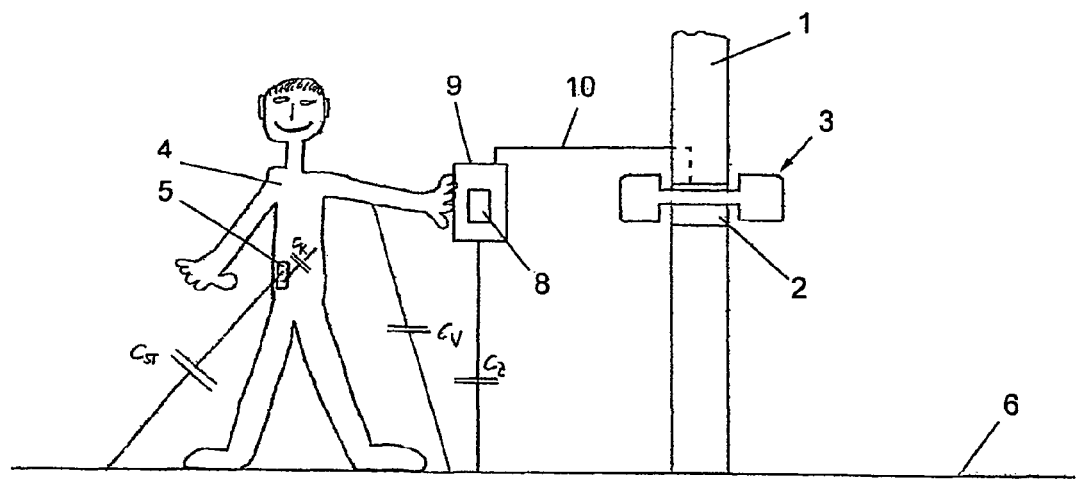

FIG. 1 schematically depicts a door with a person opening the door, as well as the individual stray, loss and coupling capacities. The door is denoted by 1 and comprises a lock 2 including an actuating member 3 designed as a knob. The person 4 carries an electronic key 5, which may, for instance, be kept in a trouser pocket. The electronic key produces a capacitive near field preferably having a carrier frequency onto which identification data is modulated. The capacitive near field is coupled to the body surface of the person 4 and subsequently conveyed to a wall reader 9 including a receiver unit 8. The data received by the receiver unit is transmitted to the lock 2 via a line 10, optionally after evaluation. The electronic key 5 has a stray capacity $C_{st}$ against the ground 6.

At the transition between the electronic key 5 and the person 4, a coupling capacity $C_k$ is to be observed. Furthermore, a dissipation capacity $C_v$ occurs between the person 4 and the ground 6. Finally, the receiver unit has a cylinder capacity $C_z$ against the ground.

Figure 2:
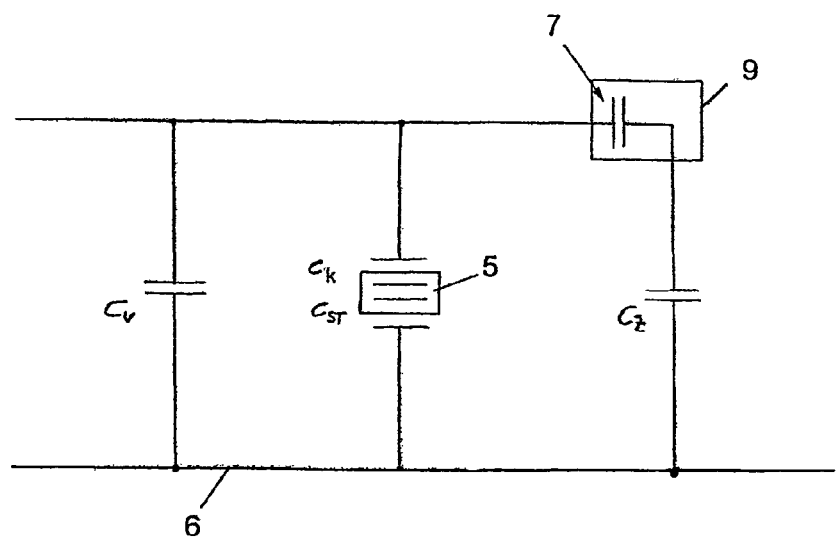
FIG. 2 is a simplified equivalent circuit diagram of the configuration according to FIG. 1.

The respective, simplified equivalent circuit diagram is illustrated in FIG. 2, with the described capacities being again indicated. Therein, $C_v$ reproduces all the capacities which result in electric fluxes that do not close from the transmitter via the receiver capacitor of the receiver, but rather pass by the same and, hence, do not contribute anything to coupling between the receiver and the transmitter. $C_{st}$ reproduces the capacities which, in sum, are available for the capacitive coupling of the transmitter bottom electrode against ground. $C_k$ reproduces the capacities which, in sum, are available for the capacitive coupling of the person 4 to the second electrode. $C_z$ reproduces the capacities which, in sum, are available for the capacitive coupling from the receiver unit 8, or wall reader 9, to the ground. In FIG. 2, the wall reader is again denoted by 9 and comprises a receiver capacitor 7. The receiver capacitor 7 is to be devised such that a sufficient electric flux will, on the one hand, close via the receiver capacitor and the voltage at the capacitor will, on the other hand, not become too small. If the capacity of the receiver capacitor is too small, too little electric flux will close via the same. Yet, also too large a capacity of the receiver capacitor is disturbing in that the voltage at the capacitor $u=q/c$ will become unfavorably small.

Figure 3:
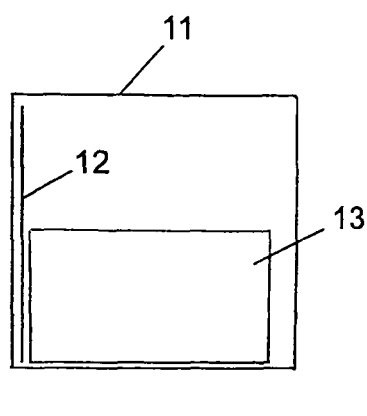
FIGS. 3 and 4 are schematic illustrations of the receiver unit separate from the lock.
Figure 4:
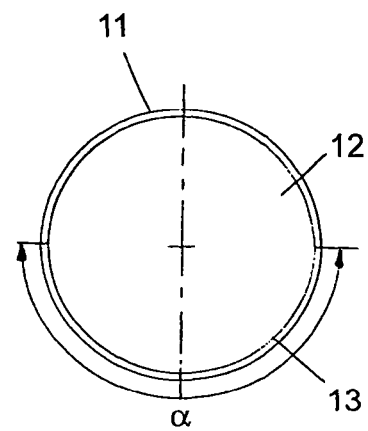
Figure 5:
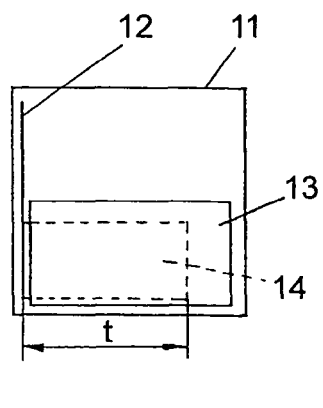
FIGS. 5 and 6 show a modified configuration of the receiver unit.
Figure 6:
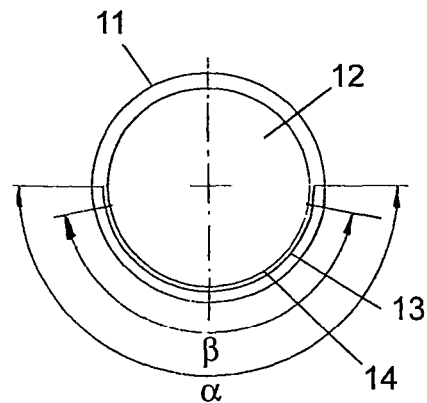

FIG. 3 is a side view, and FIG. 4 a front view, of a cylindrical wall reader, which is, for instance, integrated in an electrical installation box 11. Within the box 11, a first electrode 12 and a second electrode 13 of the receiver capacitor are illustrated. In order to improve the stray behavior against the ground 6, the second electrode 13 is arranged substantially perpendicular to the circularly designed, first electrode 12. The second electrode in this case is designed to be curved parallelly with the cylindrical jacket surface of the box 11. The surrounding angle α may be chosen between 0 and 360° as a function of the respective requirements. To adapt the internal capacity of the receiver capacitor, the electrode 12 can be supplemented with an additional part 14, as is illustrated in FIGS. 5 and 6. The projection part 14 is designed to be curved parallelly with the electrode 13 and can be varied in terms of depth for adaptation purposes. The surrounding angle β can be varied too.

The electrodes 12 and 13 may, for instance, be made of a sufficiently conductive material (e.g. metals), a sufficiently conductive foil (e.g. metal foil), a sufficiently conductive coating, a sufficiently conductive varnish or in any other way.

The electrode 12 can also form the end face of the wall reader or be attached to the same, similarly the electrode 13 can be formed by the wall reader box 11, parts of the same or be attached to the same. The end face of the box 11 in a preferred configuration may be round or even rectangular.

When mounting electrical installation boxes 11, the electrode 12 may be formed by or on a commercially available blind cover.

Figure 7:
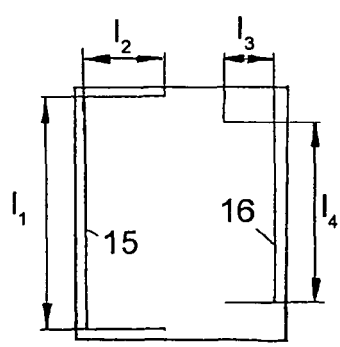
FIGS. 7 and 8 show a further modified configuration of the receiver unit.
Figure 8:
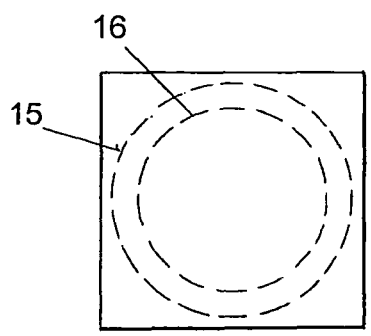

In the illustration according to FIGS. 7 and 8, the receiver unit is, for instance, designed as a desktop reader for horizontal placement. In this case, two parallel electrodes 15 and 16 of the receiver capacitor are provided. In this embodiment, the internal capacity of the receiver capacitor can be particularly well realized by varying the length $l_1$ and/or $l_3$. Naturally, any means common in electrical engineering will be available for an adaptation ($l_1$, $l_4$, distance between electrodes 15 and 16). The stray behavior and the coupling behavior of the electrodes 15 and 16 relative to the electronic key can be particularly well adapted as a function of use (wall reader, desktop reader) by the lengths $l_1$, $l_2$, $l_3$, $l_4$ and the electrode spacing.

The electronics necessary in the box 11 in addition to the electrodes can be placed on suitable sites (between the electrodes, beside the electrodes, or in front or behind the individual electrodes).

In the main, read or read/write unit configurations in the form of wall readers, desktop readers and reader terminals are preferred:

A wall reader is provided for mounting on a wall. It comprises the transmitter and receiver electrodes, the reader electronics, the evaluation electronics for determining access authorization as well as a release element such as, e.g., a relay or a semiconductor release element (MOSFET, transistor). Optionally, signaling means such as, e.g., LEDs and/or buzzers may be provided. The energy supply can be achieved by a power supply unit or by batteries. The evaluation circuit and the release element can also be accommodated in a separate housing (e.g. in the safe region).

A desktop reader is usually mounted or placed near a computer. Its task is to transfer data from the electronic key to the computer and, vice versa, from the computer to the electronic key. The desktop reader includes the transmitter and receiver electrodes, the reader electronics as well as, if required, electronics enabling the transfer of data to the computer. Optionally, signaling means such as LEDs and/or buzzers may also be provided. The energy supply can be achieved by a power supply unit, from the computer or by batteries.

The reader terminal is usually employed as a data read-out unit including a transfer unit. Thereby, data can also be transferred over major distances, e.g. 1 km. The terminal is frequently also used as an interface converter. Data will be exchanged at an interface with an instrument such that the interface protocol decisive for the instrument will be fully observed. In most cases, it is thus mounted near or within the instrument (where technically feasible). If required, a reader terminal may also write data on the electronic key.

The invention claimed is:

1. An access control device, comprising:
    a lock with a locking element,
    an actuating element for the locking element,
    an electronic key,
    a receiver unit for receiving key identification data, and
    an evaluation circuit for determining access authorization based on the received identification data, said evaluation circuit cooperating with one or more of the actuating element and the locking element for selectively locking or unlocking the lock, wherein
    the electronic key (5) comprises means for generating a capacitive near field via which the identification data is emitted,
    the electronic key (5) further comprises a device for coupling the capacitive near field to a person (4) carrying the key, and
    the receiver unit (8) is designed as a wall or desktop reader unit (9) separate from the lock and the actuating element, and the receiver unit (8) comprises at least one capacitive coupling surface such that, at a contact of the capacitive coupling surface or an approach of the capacitive coupling surface by said person (4), an alternating current circuit is closed and an electric flux is created across the receiver unit (8), and said flux is detected by the receiver unit (8).

2. A device according to claim 1, wherein the receiver unit comprises at least two electrodes (12, 13) jointly forming a receiver capacitor.

3. A device according to claim 1, further comprising a transmitter unit for transmitting data to the electronic key (5).

4. A device according to claim 3, wherein the transmitter unit comprises means for generating a capacitive near field and for coupling the field to the person (4) carrying the key (5).

5. A device according to claim 3, wherein the transmitter unit comprises at least two electrodes jointly forming a transmitter capacitor.

6. A device according to claim 2, further comprising a transmitter unit for transmitting data to the electronic key (5), wherein
the transmitter unit comprises at least two electrodes jointly forming a transmitter capacitor, and
at least one of the electrodes of the receiver capacitor, also forms one of the electrodes of the transmitter capacitor.

7. A device according to claim 2, wherein at least one of the electrodes is formed as a conductive foil on a component of the receiver unit (8).

8. A device according to claim 2, wherein at least one of the electrodes is formed as a conductive coating of the receiver unit (8).

9. A device according to any claim 2, wherein the electrodes (12, 13) of the receiver capacitor are arranged in an electrical installation box (11), or said electrodes (12, 13) are formed as parts of the electrical installation box (11).

10. A device according to claim 2, wherein a first one of said electrodes (12) of the receiver capacitor is arranged in a plane transverse to a second one of the electrodes (13) of the receiver capacitor.

11. A device according to claim 2, wherein
a first one of said electrodes (12) of the receiver capacitor is designed to be a circular electrode, and
a second one of said electrodes (13) of the receiver capacitor is designed to have an axis that is arranged transversely to the circular electrode according to a partial jacket surface of a cylinder, and
a radius of the cylinder substantially corresponds to a radius of the circular electrode.

12. A device according to claim 11, wherein the circular electrode (12) carries a projection (14) arranged within a jacket surface of said second one of said electrodes (13) and curved parallelly with the second one of said electrodes (13).

13. A device according to claim 1, wherein the receiver unit (8) is arranged in a read or write/read device (9) separate from the lock (2) and connected with the evaluation circuit in a wireless manner or by a cable.

14. A device according to claim 13, wherein the evaluation circuit is arranged within the read or write/read device (9).

15. A device according to claim 13, wherein the read or write/read device (9) comprises an interface for transmitting identification data, and for transmitting one or more of authorization information of the electronic key (5), and information on closing and opening procedures, to external equipment.

16. A write/read device for a device according to claim 1.

17. A write/read device according to claim 16, wherein the receiver unit (8) comprises at least two electrodes (15, 16) jointly forming a receiver capacitor.

18. A write/read device according to claim 17, wherein at least one of the electrodes is formed as a conductive foil on a component of the receiver unit.

19. A write/read device according to claim 17, wherein at least one of the electrodes is formed as a conductive coating of the receiver unit.

20. A write/read device according to claim 17, wherein the two electrodes (15, 16) of the receiver capacitor are arranged in parallel.

21. A write/read device according to claim 20, wherein a first one (16) of the two parallelly arranged electrodes (15, 16) is arranged within a parallel projection of a second one of the electrodes (15), and has a smaller surface area than a surface area of the second one of the electrodes (15).

22. A write/read device according to claim 16, further comprising an interface for transmitting identification data, and for transmitting one or more of authorization information of the electronic key, and information on closing and opening procedures, to external equipment.

23. A device according to claim 3, wherein the receiver unit (8) and the transmitter unit are arranged in a read or write/read device (9) separate from the lock (2) and connected with the evaluation circuit in a wireless manner or by a cable.

* * * * *